(12) United States Patent
Wernze et al.

(10) Patent No.: US 11,775,925 B2
(45) Date of Patent: Oct. 3, 2023

(54) ROUTE PLANNING ENGINE USING UNIQUE LOCATION IDENTIFIERS

(71) Applicant: SAP SE, Walldorf (DE)

(72) Inventors: Frank Wernze, Berneck (CH); Gerhard Schick, St. Ingbert (DE)

(73) Assignee: SAP SE, Walldorf (DE)

( * ) Notice: Subject to any disclaimer, the term of this patent is extended or adjusted under 35 U.S.C. 154(b) by 311 days.

(21) Appl. No.: 17/092,008

(22) Filed: Nov. 6, 2020

(65) Prior Publication Data

US 2022/0147930 A1 May 12, 2022

(51) Int. Cl.
*G06Q 10/0631* (2023.01)
*G06Q 10/0835* (2023.01)
(Continued)

(52) U.S. Cl.
CPC ... *G06Q 10/08355* (2013.01); *G01C 21/3423* (2013.01); *G01C 21/3446* (2013.01); *G06F 16/29* (2019.01); *G06F 16/9537* (2019.01); *G06Q 10/047* (2013.01); *G06Q 10/06312* (2013.01); *G06Q 10/06315* (2013.01); *G06Q 30/0205* (2013.01); *G06Q 30/0635* (2013.01); *G06Q 50/30* (2013.01)

(58) Field of Classification Search
None
See application file for complete search history.

(56) References Cited

U.S. PATENT DOCUMENTS 9,726,502 B2 8/2017 Ni et al.
10,049,338 B2 8/2018 Pillai et al.
(Continued)

FOREIGN PATENT DOCUMENTS

CA 3000456 A1 4/2017
CN 101853294 B 12/2011
(Continued)

OTHER PUBLICATIONS

Teodor et al "Synchronized multi-trip multi-traffic pickup & delivery in city logistics" Dec. 2015, Transportation Research Procedia, pp. 26-39 (Year: 2016).*
(Continued)

*Primary Examiner* — Romain Jeanty
(74) *Attorney, Agent, or Firm* — Klarquist Sparkman, LLP

(57) ABSTRACT

Technologies are described for determining route proposals for shipment of cargo using unique location identifiers (ULIs). For example, a pickup ULI and a delivery ULI can be received. The pickup ULI and the delivery ULI are in the ULI data structure format defined herein. A first geographic area representing a pickup leg can be determined for shipment of the cargo from the pickup ULI to a first transportation network location and a second geographic area representing a delivery leg can be determined for shipment of the cargo from a second transportation network location to the delivery ULI. The main leg of the shipment occurs between the first transportation network location and the second transportation network location and travels through one or more defined transportation networks. Route proposals can be generated for shipment of the cargo through the pickup leg, main leg, and/or delivery leg.

19 Claims, 8 Drawing Sheets

(51) Int. Cl.
*G06F 16/9537* (2019.01)
*G06F 16/29* (2019.01)
*G01C 21/34* (2006.01)
*G06Q 10/047* (2023.01)
*G06Q 30/0204* (2023.01)
*G06Q 30/0601* (2023.01)
*G06Q 50/30* (2012.01)

(56) References Cited

U.S. PATENT DOCUMENTS

| | | | |
|---|---|---|---|
| 10,464,106 B1 | 11/2019 | Mo | |
| 10,467,563 B1 | 11/2019 | Mo | |
| 2003/0014286 A1 | 1/2003 | Cappellini | |
| 2003/0167109 A1* | 9/2003 | Clarke | G06Q 10/06312 |
| | | | 701/3 |
| 2005/0006470 A1* | 1/2005 | Mrozik | G06Q 10/08 |
| | | | 235/384 |
| 2007/0299686 A1* | 12/2007 | Hu | G06Q 10/08 |
| | | | 705/334 |
| 2008/0294484 A1 | 11/2008 | Furman et al. | |
| 2010/0131431 A1 | 5/2010 | Esau et al. | |
| 2010/0250461 A1 | 9/2010 | Arnold | |
| 2010/0287073 A1 | 11/2010 | Kocis et al. | |
| 2013/0151435 A1 | 6/2013 | Hocquette et al. | |
| 2014/0180958 A1* | 6/2014 | Arunapuram | G06Q 10/047 |
| | | | 705/338 |
| 2014/0279661 A1 | 9/2014 | Zahn et al. | |
| 2015/0019384 A1 | 1/2015 | Fabian | |
| 2015/0142594 A1* | 5/2015 | Lutnick | G06Q 30/08 |
| | | | 705/26.81 |
| 2015/0166163 A1* | 6/2015 | Longson | B63J 99/00 |
| | | | 340/984 |
| 2015/0248639 A1 | 9/2015 | Maney et al. | |
| 2016/0098677 A1* | 4/2016 | Kim | G06Q 10/0833 |
| | | | 705/333 |
| 2017/0091320 A1* | 3/2017 | Psota | G06F 16/3337 |
| 2017/0325068 A1 | 11/2017 | Bertelli | |
| 2017/0328725 A1 | 11/2017 | Schlesinger et al. | |
| 2018/0047295 A1 | 2/2018 | Ricci | |
| 2018/0053229 A1* | 2/2018 | Bhatnagar | G06Q 20/12 |
| 2019/0259082 A1 | 8/2019 | Malewicz | |

FOREIGN PATENT DOCUMENTS

| | | | |
|---|---|---|---|
| WO | WO-2012112399 A2 * | 8/2012 | G06K 7/10386 |
| WO | WO2019/009414 A1 | 1/2019 | |
| WO | WO-2020034044 A1 * | 2/2020 | |

OTHER PUBLICATIONS

Abramowicz, Towards a Service-Based Internet 4th European Conference, ServiceWave 2011, Poznan, Poland, Oct. 26-28, 2011, Proceedings, Springer (Year: 2011).*

Ning "A Global and Dynamitc Route Planning Application for Smart Transportation", Dec. 2015, IEEE, pp. 203-208 (Year: 2015).*

Santha, "Design and Development of Integrated Algorithm for Effective Multimodal Transportation," Chapter 2, 2. Multimodal Transportation, http://hdl.handle.net/10603/35999, pp. 28-63, Feb. 19, 2015.

Chen et al., "A Simulation Platform for Combined Rail/Road Transport in Multiyards Intermodal Terminals," *Journal of Advanced Transportation*, vol. 2018, 19 pages, Feb. 28, 2018.

Caris et al., "Decision Support in Intermodal Transport: a New Research Agenda," *Computers in Industry*, vol. 64, pp. 105-112, Jan. 6, 2013.

Madroñero et al., "A Review of Tactical Optimization Models for Integrated Production and Transport Routing Planning Decisions," *Computers & Industrial Engineering*, vol. 88, pp. 518-535, Jun. 22, 2015.

"Transportation Management Suite for Sage X3," http://x3-routeoptimizer.com/#features, 7 pages, Feb. 18, 2020.

Extended European Search Report, European Patent Application No. 21200385.9, 8 pages, dated Mar. 18, 2022.

Extended European Search Report, European Patent Application No. 21206224.4, 10 pages, dated Mar. 18, 2022.

* cited by examiner

ROUTE PLANNING ENGINE USING UNIQUE LOCATION IDENTIFIERS

BACKGROUND

Organizations often use route planning technologies to ship goods from one location to another. For example, route planning technologies can be used to plan shipment of goods between locations (e.g., cities) using various types of transportation networks, including rail networks, airline networks, ocean shipping networks, etc.

Route planning systems perform route planning using defined transportation networks with established locations. For example, a rail transportation network can be defined by a set of established rail locations and their associated rail services (e.g., locations where cargo can be loaded and/or unloaded, special cargo handling services, repair services, etc.). When performing route planning for a new location (e.g., a business location) using such route planning systems, the new location is added to the system.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various technologies are described herein for determining route proposals for shipment of cargo using unique location identifiers (ULIs). For example, ULIs can be used for the pickup and delivery locations. Corresponding first and second geographic areas can be determined for the pickup and delivery legs for transporting the cargo to and from defined transportation networks. For a main leg of the shipment, possible routes can be determined within the defined transportation networks. In some implementations, pre-processing operations are performed to determine the possible routes within a main geographic area representing the main leg. In some implementations, the main geographic area is divided into geographic sub-areas. The locations of the possible routes can be provided for route optimization. Route proposals can then be generated covering the pickup leg, the delivery leg, and the main leg.

DETAILED DESCRIPTION

Overview

Figure 1:
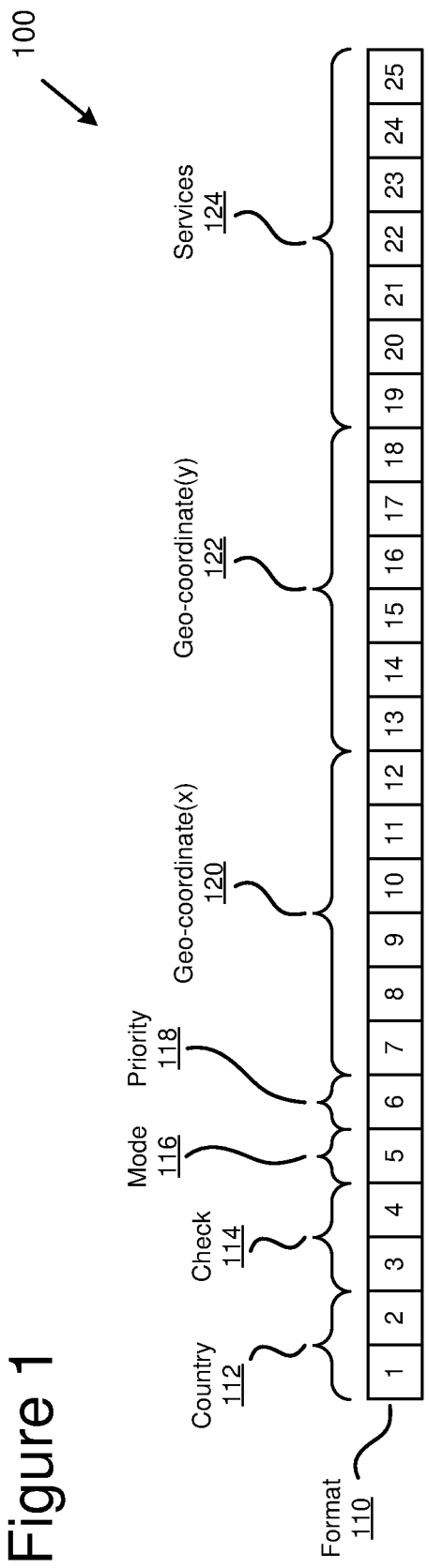
FIG. 1 is a diagram depicting an example unique location identifier data structure format for use in transportation route planning.

The following description is directed to technologies for determining route proposals for shipment of cargo using unique location identifiers (ULIs). For example, a pickup ULI and a delivery ULI can be received. The pickup ULI and the delivery ULI are in the ULI data structure format defined herein. Using the pickup and delivery ULIs, corresponding first and second geographic areas can be determined. The first geographic area is the pickup leg for shipment of the cargo from the pickup ULI to a first transportation network location and the second geographic area is the delivery leg for shipment of the cargo from a second transportation network location to the delivery ULI. The main leg of the shipment occurs between the first transportation network location and the second transportation network location and travels through one or more defined transportation networks. Route proposals can be generated for shipment of the cargo through the pickup leg, main leg, and/or delivery leg.

For the main leg of the shipment, possible routes can be determined within the defined transportation networks. In some implementations, pre-processing operations are performed to determine the possible routes within a main geographic area representing the main leg. In some implementations, the main geographic area is divided into geographic sub-areas. The locations of the possible routes can be provided for route optimization. Route proposals can then be generated covering the pickup leg, the delivery leg, and the main leg The pre-processing operations can determine the possible routes from a first transportation network location (e.g., an origin location) to a second transportation network location (e.g., destination location). In some implementations, instead of using static definitions of the defined transportation networks, the pre-processing operations determine the possible routes using dynamically generated representations of at least portions of one or more defined transportation networks. For example, the pre-processing operations can dynamically determine a main geographic area that covers the origin location and the destination location. The pre-processing operations then dynamically determine possible routes from the origin location to the destination location using only those locations that are within the main geographic area (and not any locations that are outside the main geographic area). In some implementations, the pre-processing operations determine all possible routes from the origin location to the destination location that utilize those locations within the main geographic area, which may also be filtered based on various transportation requirements (e.g., limited to locations that provide specific transportation services). The locations that make up the possible routes are then processed (e.g., by a route optimizer) to determine optimal routes from only those locations that make up the possible routes (i.e., not considering locations that are not included in the possible routes).

The possible routes are determined from a number of locations (e.g., addresses, cities, etc.) that are part of one or more defined transportation networks. For example, a given defined transportation network can be defined by a set of locations that make up the transportation network (e.g., as a set of location tuples defining each connection of the transportation network). Each location is also associated with a set of transportation services.

In some implementations, the pickup location and the delivery location are defined by a customer order. For example, the customer order can be an order for a shipment (e.g., of goods) from the pickup location to the delivery location. The customer order can comprise other transportation requirements, such as origin and destination locations, transportation network requirements, cost requirements, etc.

Because only those locations that make up the possible routes are used for determining the optimized routes (e.g., are passed to the route optimizer), the route optimization process can be more efficient. For example, the pre-processing operations can determine possible routes for a specific source location and destination location that are within a main geographic area (and/or within sub-areas, which can be of specific location types). Furthermore, the pre-processing operations can consider fewer than all available transportation requirements when determining the possible routes (e.g., the pre-processing operations can use dynamically generated representations of portions of the defined transportation networks that do not consider requirements such as capacity, cost, and/or time transportation requirements). The pre-processing operations can pass just the locations that make up the possible routes for use in determining the optimized routes. In this way, the route optimizer does not have to consider all locations (e.g., all locations of one or more defined transportation networks), and all transportation requirements for all locations, when determining the optimized routes. Instead, the route optimizer can consider just those locations received from the pre-processing operations (e.g., from the route pre-processor), resulting in a smaller set of locations to evaluate. This results in a reduction in computing resource utilization by the route optimizer (e.g., reduced processor, memory, bandwidth, and/or storage resources). This also results in less overall time needed by the route optimizer to produce optimized routes (e.g., a reduction from minutes or hours to seconds).

In some previous solutions, the route optimizer analyzes routes using all, or nearly all, locations of a given defined transportation network (or given defined transportation networks) and using various transportation requirements (e.g., available capacity, delivery time, etc.) to come up with optimized routes. If the number of network of locations being analyzed is relatively large, the optimizer may take far too long to produce results (e.g., to determine optimized routes). To reduce the time needed to determine optimized routes, a route pre-processor can be implemented to determine possible routes using a smaller number of available locations (e.g., limited by geographic areas and/or sub-areas) and/or considering a smaller number of transportation requirements. For example, using a limited definition of the defined transportation networks (e.g., dynamically generated representations that indicate which locations are connected, via one or more defined transportation networks, to which other locations), possible routes can be determined by the pre-processor that are valid (e.g., possible routes that may provide transport from an origin location to a destination location, even though a portion of the possible routes may be knocked out by the optimizer based on the additional factors being considered, such as additional transportation requirements, transportation schedules, etc.).

In some previous solutions, the route optimizer is an existing (e.g., legacy) application that is difficult to modify. Using a route pre-processor in this situation can provide flexibility and efficiency to the overall route determination process. For example, the route pre-processor can be easily and quickly modified to determine possible routes using a limited number of locations and/or transportation requirements. Indications of the possible routes (e.g., just the locations used by the possible routes) can be passed to the route optimizer, which limits the effort needed by the route optimizer to determine optimized routes.

In some previous solutions, locations need to be created in the route planning system (e.g., in a legacy route planning or route optimizing system) before they are used (e.g., for route planning) For example, systems that use defined transportation networks for route planning have a set of established locations for the defined transportation networks. Requiring that locations be created in the system before they are used for route planning, while helpful for certain types of transportation networks, can be problematic in some situations. For example, it can be time consuming to generate locations that may only be used a small number of times, or only once, such as a business location for a customer wanting to obtain a shipping quote. The solutions described herein provide advantages in such situations. For example, a customer can obtain a shipping quote, comprising route proposals, without having to create a pickup and/or delivery location in the route planning system. This can provide savings in terms of computing resources (e.g., processing, memory, and storage resources) and provide increased security and protect customer privacy.

Locations

The technologies described herein are applied to route planning between locations. As used herein, the term "location" refers to a geographic location. For example, a location corresponds to a city, to a location within a city, or to another type of location (e.g., geographical coordinates of a coal mine). For example, a location can be identified by its city name and/or by another type of identifier (e.g., a unique identifier). In some implementations, a location is identified by geographic coordinates (e.g., latitude and longitude).

As used herein, locations (also referred to as transportation network locations or established locations) are part of defined transportation networks (e.g., a location that has a rail terminal and is part of a specific rail transportation network and/or a location that has an airport and is part of a specific domestic airline transportation network). For example, a location can serve as an origin or a destination for a specific route through one or more defined transportation networks. Some locations allow for a change in the type or mode of transportation (e.g., to switch between a train transportation network and an airline transportation network). In general, the main leg routing described herein is performed between locations that are part of one or more defined transportation networks. The location where the shipment enters the defined transportation networks is referred to as the origin location, and the location where the shipment leaves the defined transportation networks is referred to as the destination location.

However, outside of the defined transportation networks (e.g., outside the main leg), a different type of location is used, which is an arbitrary location (also referred to as a non-network location). In some implementations, arbitrary locations are not part of a defined transportation network with established locations and schedules. An example of an arbitrary location is a location of a business that is not part of a defined transportation network (e.g., a rail transportation network with a set of defined rail terminal locations or an airline transportation network with a set of defined airport locations). In the technologies described herein, arbitrary locations are defined by unique location identifiers (ULIs)

An arbitrary location can be the pickup location for a shipment (e.g., where the shipment is picked up from a business by a truck and delivered to a transportation network location) and/or the delivery location for a shipment (e.g., where the shipment is delivered to a business address from a transportation network location). In the technologies described herein, unique location identifiers (ULIs) are used for arbitrary locations. In some implementations, ULIs can be used for transportation network locations as well.

Each location is associated with a set of services (also referred to as transportation services). Services are grouped into a set of services called service groups. Service groups can be defined specific to the needs of the routing requirements, and therefore they describe specific setups, objects, and/or network properties that can be used for filtering locations to identify the pickup leg, main leg, and/or delivery leg. The service products can be created or defined by grouping requirements which are used for the location filtering. In some implementations, service products are described by their assigned services, including (1) location properties, (2) any location tuple representing a network connection, (3) network properties (e.g. passenger versus freight transportation network), etc.

Services can be assigned to multiple service groups and can thus support different network variations. Any dependent requirement for route determination can be performed by first identifying the set of service products and pre-filtering the available locations. For example, for a pickup leg, the locations can be filtered by the freight transportation request in the customer order (e.g., locations supporting automotive loading or unloading, or locations supporting container loading or unloading to/from truck or train).

The set of services for a given location define the transportation options that are available at the given location. For example, a particular city may have specific types of railway services (e.g., rail station for passenger trains, rail station for freight transportation, rail station with locomotive repair services, delivery of containers to local customers, handling services for dangerous materials, etc.), specific types of ocean transportation services (e.g., ramps for container vessels), and specific types of air transportation services (e.g., airport for domestic flights, airport for international flights, military airport, etc.).

Transportation Networks

As used herein, a "defined transportation network" is a network for moving things (e.g., goods, people, etc.) from one location to another using a mode of transportation. Example defined transportation networks include railway networks (e.g., a fast train network, a freight train network, etc.), airline networks (e.g., domestic airline networks, international airline networks, ocean freight networks, etc. A given defined transportation network has a "type" or a "mode of transportation," which describes the type of transportation used by the defined transportation network (e.g., a rail transportation network, an airline transportation network, etc.).

A defined transportation network is comprised of a number of transportation network locations (e.g., cities). Each location of a defined transportation network is connected by a reference to at least one other location of the defined transportation network (e.g., which can be referred to as one or more predecessor locations and/or one or more successor locations). In some implementations, a defined transportation network is defined by a number of network location tuples, where each network location tuple represents a connection (also referred to as a stage) of two consecutive locations (i.e., that have no other locations between them).

In some implementations, defined transportation networks are defined in terms of their locations. For example, a given defined transportation network can be defined by all of the locations associated with the given defined transportation network. Furthermore, each location may be a member of one or more different defined transportation networks. For example, a specific city may have access to a fast train network, an international airline network, and a domestic airline network.

Each location can be associated with a set of transportation services. The transportation services can indicate which defined transportation network, or defined transportation networks, a given location is a part of. The transportation services can also indicate other transportation network services that are available at, or associated with, a given location. For example, a first location could have the following set of transportation services: freight train transportation network (indicating that the first location is part of the freight train transportation network), train repair facility (indicating that the first location has a train repair facility), etc. A second location could have the following set of transportation services: freight train transportation network (e.g., with no additional services), international airline transportation network (e.g., with additional services such as an airline repair facility and a customs facility), domestic airline transportation network, and an ocean cargo transportation network (e.g., with additional services such as container loading, customs facility, and dangerous goods handling).

A defined transportation network is associated with a schedule (also referred to as a transportation schedule). A schedule defines the service times (e.g., arrival and departure times) for a given defined transportation network. For example, a schedule for an international airline transportation network can comprise flight information (e.g., indicating when various flights arrive and/or depart the various locations of the international airline transportation network, as well as other scheduling attributes such as passenger and cargo capacity, special handling for certain flights, etc.) for one or more specific airline carriers that are part of the international airline transportation network.

Customer Orders

In the technologies described herein, customer orders can be used to define, at least in part, transportation requirements that are used to identify possible routes and/or optimized routes. As used herein, the term "customer order" refers to any type of information that identifies and/or describes transportation (e.g., a shipment of goods, a person traveling, etc.) from one location (e.g., a pickup location) to another location (e.g., a delivery). Customer orders can come in a variety of forms, including agreements, contracts, requests for quotes, and/or other types of documents. For example, a customer could generate a customer order to request a shipping proposal for shipping goods from a pickup location to a delivery location. The shipping proposal could comprise a route proposal (e.g., one or more proposed routes, which can comprise optimized routes), cost information, timing information (e.g., how long it will take to ship the goods to the destination location), etc.

In some implementations, a customer order defines transportation requirements comprising a pickup location (e.g., in the format of a ULI), a delivery location (e.g., in the format of a ULI), an origin location (e.g., a city or another type of location where the shipment enters a defined transportation network) and/or a destination location (e.g., a city or another type of location where the shipment leaves a defined transportation network). A customer order can also define other types of transportation requirements. The other types of transportation requirements can include an indication of one or more defined transportation networks that are to be used. For example, the customer order could specify a shipment of goods using a rail network for a first leg of the route, followed by a domestic airline network for a second leg of the route, followed by a rail network for a third leg of the network. The other types of transportation requirements can include timing requirements, such as a drop off time (e.g., a date and/or time when the goods will be at the pickup location ready for shipment), an arrival time (e.g., a date and/or time by which the shipment must arrive at the delivery location), a transit time (e.g., a maximum amount of time for the shipment to arrive after leaving the origin location), and/or other timing requirements. The transportation requirements can also include special handling requirements (e.g., dangerous goods handling). The transportation requirements can also include shipping and/or delivery addresses or pricing requirements (e.g., a price range, or price limit, for transportation costs).

There are other types of transportation requirements that may, or may not, be defined by the customer order. In some implementations, transportation can include requirements that are specific to a given defined transportation network. For example, a freight rail transportation network can include transportation requirements such as locomotive requirements (e.g., locations where specific types of locomotives are available, etc.), crew requirements (e.g., locations where crew are available or locations where rest or stop-over is available), etc. Transportation requirements and/or services can also be grouped to make filtering more efficient.

In general, the transportation requirements (whether explicitly defined by the customer order, derived from the customer order, and/or obtained from other sources) can be used to filter locations that are available for determining possible routes. For example, pre-processing can include identifying the locations within a given geographic area and/or sub-area. The locations can be filtered based on the transportation requirements. The filtered locations can then be used to determine possible routes.

Unique Location Identifiers

In the technologies described herein, unique location identifiers are used to identify certain locations for route planning A unique location identifier (ULI) is able to identify a location anywhere in the world using the same data structure format. For example, locations in different countries (e.g., addresses and/or other locations in different countries) can be identified using unique location identifiers with the same data structure format.

The unique location identifiers are represented by a data structure format that has a number of fields that contain characters (e.g., digits, letters and/or special characters). In some implementations, a character is an 8-bit value. The data structure format of the unique location identifiers is a human readable format. For example, a person could enter a ULI using a keyboard. ULIs can also be processed using computing devices.

FIG. 1 is a diagram depicting an example unique location identifier data structure format 110 for use in transportation route planning. The example unique location identifier data structure format 110 contains a number of fields, including a country field 112, a check field 114, a mode field 116, a priority field 118, a first geo-coordinate field 120, a second geo-coordinate field 122, and a services field 124. The country field 112 indicates which country the location is in. In some implementations, the country field 112 is a two-character field. For example, if the location is in the United States, then the country field could be "US". If the location is in Canada, then the country field could be "CA". Depending on the specific implementation, the country field 112 could be represented by a different number of characters (e.g., a one-character field, a three-character field, etc.).

The check field 114 is a check number that is used to check whether a given ULI is valid. In some implementations, the check field 114 is a two-character field. In some implementations, the check number is a pre-defined number used to check whether the ULI is valid. For example, a check number of "11" could be used for rail locations located in Canada. The check number could also indicate how many fields are present (e.g., the check number of "11" could indicate that the ULI format contains all seven fields). In some implementations, the check number can be used to check the validity of the ULI format without accessing any database information (e.g., the format of the ULI can be checked without checking whether specific geo-coordinates are present in a database). In some implementations, the check field contains another type of error detection code (e.g., a check number processed according to ISO 7064). In some implementations, one or more of the characters of the check field 114 can be treated independently (e.g., the first character can indicate one routing attribute and the second character can indicate a different routing attribute). Depending on the specific implementation, the check field 114 could be represented by a different number of characters (e.g., a one-character field, a three-character field, etc.).

The mode field 116 indicates the transportation mode associated with the location. In some implementations, the mode field 116 is a one-character field. For example, the transportation mode could be rail (e.g., indicated by the character "R"), air (e.g., indicated by the character "A"), sea (e.g., indicated by the character "S"), or truck (e.g., indicated by the character "T"). In some implementations, a more specific transportation mode (e.g., cargo versus passenger) could be indicated by this field (e.g., using a two-character field, rail cargo could be indicated by "RC" and rail passenger could be indicated by "RP"). Depending on the specific implementation, the mode field 116 could be represented by a different number of characters (e.g., a two-character field, a three-character field, etc.).

The priority field 118 indicates the priority of the transportation network and/or customer. In some implementations, the priority field 118 is a one-character field. The priority field 118 can indicate relative priority for selecting locations among a number of available locations. For example, a higher priority could indicate a location with higher speed and/or larger capacity (e.g., a higher speed and/or higher capacity rail network location) while a lower priority could indicate a location with slower speed and/or lower capacity (e.g., a slower speed and/or lower capacity rail network location). As another example, the priority field 118 can indicate customer priority for a customer location (e.g., a high priority customer that receives preferred treatment or a normal priority customer). Depending on the specific implementation, the priority field 118 could be represented by a different number of characters (e.g., a two-character field, a three-character field, etc.).

The first geo-coordinate field 120 indicates an x-coordinate (latitude) of the location. In some implementations, the first geo-coordinate field 120 is a six-character field. Depending on the implementation, this field could longer or shorter than six characters (e.g., depending on the amount of precision needed). The second geo-coordinate field 122 indicates a y-coordinate (longitude) of the location. In some implementations, the second geo-coordinate field 122 is a six-character field. Depending on the implementation, this field could longer or shorter than six characters (e.g., depending on the amount of precision needed). In some implementations, the first and second geo-coordinate fields could be combined into a single geo-coordinate field indicating both latitude and longitude. In some implementations, a third geo-coordinate field can be included to indicate the z-dimension (e.g., the location can include a height component, such as indicating a specific floor within a multi-story building). For example, if the location is the city of Chicago USA, the first geo-coordinate field 120 could contain "41.88" and the second geo-coordinate field 122 could contain "−87.62".

The services field 124 indicates the transportation services present at the location. In some implementations, the services field 124 is a seven-character field. For example, the services field 124 can indicate transportation services such as a container terminal, a car terminal, heavy lifting services, a domestic airport, an international airport, specific rail companies, specific airlines, and/or other transportation services. For example, the services field 124 could contain the characters "HSR" indicating high speed rail service, "IA" indicating international airport service, and/or other characters indicating other transportation services. Depending on the specific implementation, the services field 124 could be represented by a different number of characters (e.g., a four-character field, an eight-character field, etc.).

In some implementations, the unique location identifier data structure format includes a location type field. The location type identifies how the location functions within the route planning environment. For example, a location type could indicate that the location is a port (e.g., providing a connection to a sea freight network), a railway station (e.g., providing a connection to a rail network), a production plant (e.g., indicating that the location manufacturers goods), a warehouse (e.g., indicating that the location stores goods), etc. In some implementations, the location type is a four-character field, but the number of characters can vary based on the specific implementation. In some implementations, a special location type is used to identify arbitrary locations (e.g., a value of 8000).

The unique location identifier data structure format described herein comprises at least the following information: a transportation mode (e.g., mode field 116), a priority (e.g., priority field 118), geo-coordinates indicating at least longitude and latitude (e.g., geo-coordinate field 120 and geo-coordinate field 122), and transportation services (e.g., services field 124). In other words, the country, location type, and/or the check number are optional in some implementations. For example, the country information could be derived from other information (e.g. from the geo-coordinates).

In some implementations, the unique location identifier data structure format comprises at least the following fields: a mode field (e.g., mode field 116), a priority field (e.g., priority field 118), one or more geo-coordinate fields (e.g., geo-coordinate field 120 and geo-coordinate field 122), and a services field (e.g., services field 124). In other words, the country field (e.g., country field 112), the check field (e.g., 114), and/or the location type field are optional in some implementations. For example, the country information could be derived from other information (e.g. from the geo-coordinates).

The ULI data structure format described herein provides advantages over using other types of location identifiers, such as addresses. One improvement is that processing the ULI does not require use of a database. For example, a customer could provide a location using a ULI, and the location could be used for route planning (e.g., to provide a shipping quote) without looking up the ULI data fields in a database and without storing the ULI data fields in a database. Another improvement is that a customer does not need an address in the system (e.g., in a transportation management system) in order to use the address (e.g., a customer could receive a shipping quote or route proposal as a one-time customer without having their address information in the system). Another advantage is improved privacy protection. For example, a customer does not have to provide certain personal information (e.g., name, address, phone number, etc.) in order to use a particular location for route planning (e.g., the ULI can be treated as an anonymous unique location identifier). Using the ULI technology described herein can also provide improvements in terms of computing resource utilization. For example, a quote or route proposal can be provided to a customer without having to create a location record in the system, which saves memory, storage, and/or processing resources.

An example unique location identifier is depicted at 130 that uses the example unique location identifier data structure format 110. The unique location identifier 130 is a rail network location located in Canada (country field "CA"), with a check number of "99," a transportation mode of "R," and a priority of "1".

The following table, Table 1, depicts example values that can be used for ULIs in the unique location identifier data structure format.

TABLE 1

Example Values

| Characters | Description | Example Values |
|---|---|---|
| 1-2 | Country | DE (Germany) |
| | | US (United States) |
| | | CA (Canada) |
| | | UK (United Kingdom) |

TABLE 1-continued

Example Values

| Characters | Description | Example Values |
|---|---|---|
| 3 | Check number 1: planning level status | 0 (no information about relationship between different networks)<br>1 (horizontal routing possible, vertical routing not ensured)<br>2 (vertical routing possible, horizontal routing not ensured)<br>3 (vertical and horizontal routing possible) |
| 4 | Check number 2: location status | 0 (location not maintained in system)<br>1 (location maintained but not with all location details for accurate routing maintained in system, e.g., on pick up and/or delivery route segments)<br>2 (location maintained with all location details for accurate routing maintained in system, e.g., on pick up and/or delivery route segments) |
| 5 | Transportation mode | R (Rail)<br>A (Air)<br>T (Truck)<br>S (Sea) |
| 6 | Priority (e.g., location usability for routing and the network ownership status) | 0 (no network assigned)<br>1 (network assigned and preferred, network owned by carrier)<br>2 (network assigned and to be used if 1 is not given, network owned by a partner of the carrier)<br>3 (network assigned and owned by a competitor, hence only used as exception)<br>4 (network assigned and forbidden to be used) |
| 7-12 | Latitude | (latitude of the location) |
| 13-18 | Longitude | (longitude of the location) |
| 19 | Service product with services for route section usage | 0 (not maintained)<br>1 (domestic connections only)<br>2 (international connection only)<br>3 (domestic and international connections available) |
| 20 | Service product with services for passenger or freight shipments | 0 (not maintained)<br>P (network for passenger transportation)<br>F (network for pure freight transportation)<br>M (mixed usage, e.g., for passenger and freight shipments) |
| 21 | Service product with services for type of shipment | 0 (no high speed network)<br>1 (high speed network only)<br>2 (mixed, high speed and normal speed network) |
| 22 | Service product with services for intermodal facilities at the location | 0 (no intermodal possible)<br>1 (intermodal facilities available) |
| 23 | Service product with services for car loading and unloading activities | 0 (empty)<br>1 (location has auto compound facilities)<br>2 (location is an intermodal container terminal with connection to a truck network)<br>. . . |
| 24-25 | Service product with service product ID | (Service product ID created with all services assigned representing the definition from characters 19 to 23) |
| 26-29 | Location type | 1030 (shipping point)<br>1100 (port)<br>1110 (airport)<br>1120 (railway station)<br>1150 (gateway)<br>1170 (warehouse)<br>8000 (arbitrary location)<br>. . . |

In Table 1, the characters column identifies the field, or particular character(s) within a field, in the unique location identifier data structure format. For example, characters 1-2 refer to the country field (e.g., country field 112). The check field in this particular implementation uses the two character independently. Similarly, the services field uses character(s) independently. The description column provides a brief description of the field (or characters). The example values column provides some example values that could be used when defining ULIs. However, the values that are actually used in a given implementation depend on the needs of the given implementation.

In some implementations, routing hierarchies can be used for route planning. For example, horizontal routing can be performed to determine routes or portions of routes between network locations of different organizations (e.g., when performing routing that spans multiple countries and/or multiple companies transportation networks). Horizontal routing can involve changing the mode of transportation (e.g., going form a rail network to an air network). In some implementations, horizontal routing is performed for the main leg. Horizontal routing can take into account the planning levels and/or priorities of the ULIs. Vertical routing can also be performed. Vertical routing is performed within an organization's structure (e.g., routing between locations and/or within a location). For example, vertical routing can be used for the pickup and/or delivery legs (e.g., based on planning level, location type, etc.).

Environments for Determining Routes Using ULIs

Figure 2:
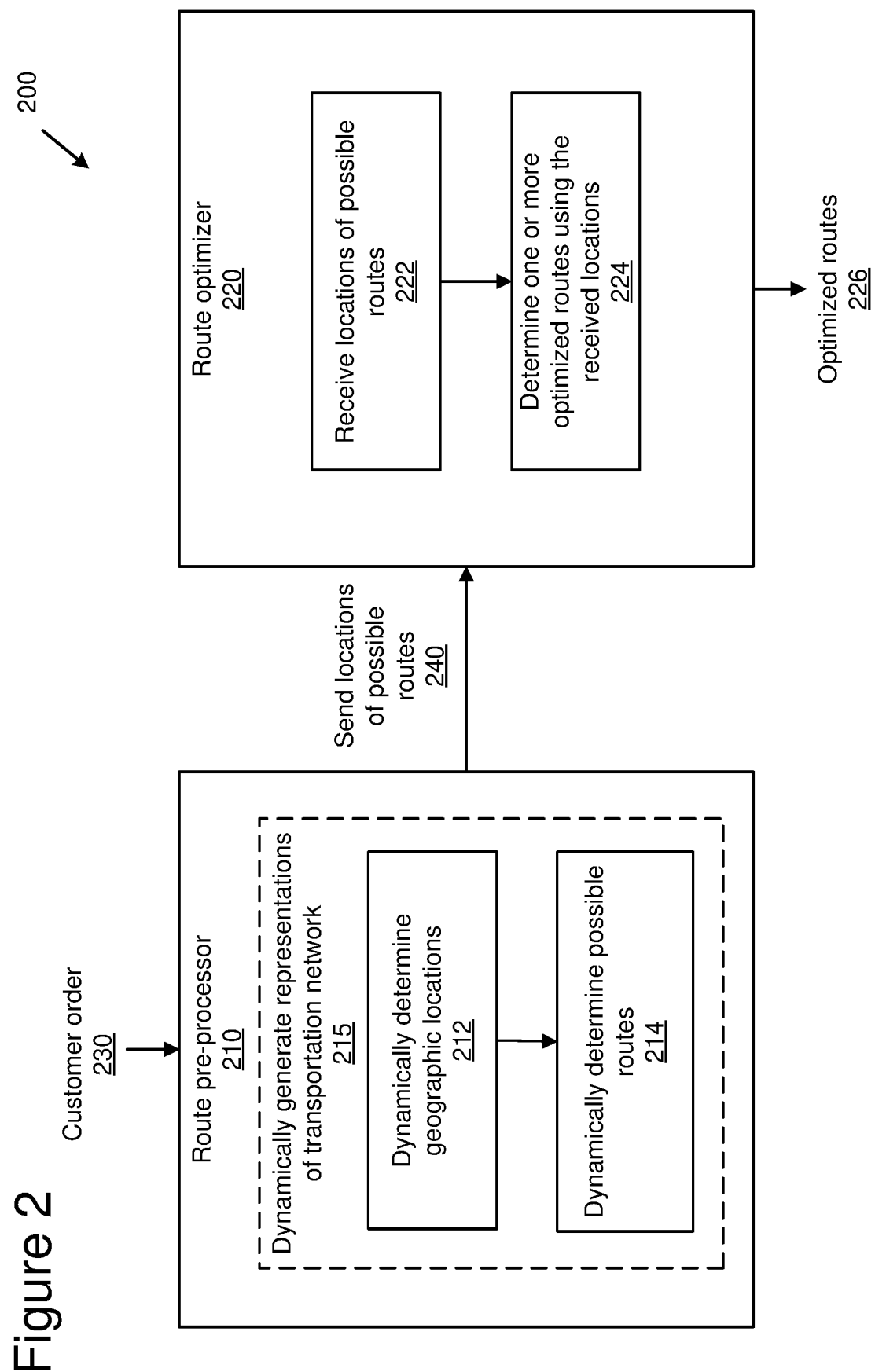
FIG. 2 is a diagram depicting an example environment for determining routes using unique location identifiers (ULIs), including a route pre-processor that determines possible routes.

FIG. 2 is a diagram depicting an example environment 200 for determining routes using ULIs, including a route pre-processor that determines possible routes. The example environment 200 includes a route pre-processor 210. The route pre-processor 210 can be implemented by various software and/or hardware resources (e.g., comprising server resources, database resources, storage resources, software resources, etc.). In some implementations, the route pre-processor 210 is implemented by computer instructions running on one or more computer devices (e.g., server resources or cloud computing resources). For example, the route pre-processor 210 can be operated as service (e.g., as a cloud service) and as part of a transportation service (e.g., a service that manages transportation and logistics for organizations, such as the SAP® Transportation Management system).

The route pre-processor 210 receives a customer order 230. For example, the customer order 230 can be received from a remote computing device over the Internet. The customer order 230 can define various aspects of a transportation activity (e.g., a shipment of goods) from one location to another. For example, the customer order 230 can comprise a pickup ULI (e.g., the address of the customer, or another address or location where the shipment is to be picked up) a destination ULI (e.g., the address or location where the shipment is to be delivered), an origin location, a destination location, and/or other transportation requirements.

The route pre-processor 210 performs various pre-processing operations to determine possible routes. The route pre-processor 210 dynamically generates representations of at least portions of one or more defined transportation networks, as indicated at 215. As depicted at 212, the pre-processing operations include dynamically determining geographic areas. In some implementations, a first geographic area is determined that covers the pickup ULI and a transportation network location (for a first leg, which is referred to as a pickup leg, of the shipment), a second geographic area is determined that covers another transportation network location and the delivery ULI (for a second leg, which is referred to as a delivery leg, of the shipment), and a third geographic area (the main geographic area) is determined that covers shipment between the transportation network locations via one or more defined transportation networks (for a third leg, which is referred to as the main leg or main carriage leg, of the shipment).

In some implementations, a given geographic area is determined as the smallest rectangular area that encompasses the start and end locations for the given leg. In some implementations, the initial geographic area for the main leg is analyzed to determine if it contains at least one possible route from the origin location to the destination location using only those locations within the initial geographic area. If it does, then the pre-processing operations proceed using the initial geographical area. If not, then the initial geographic area is incrementally increased in size until it does contain at least one route from the origin location to the destination location.

As depicted at 214, the pre-processing operations include dynamically determining possible routes within one or more of the geographic area determined at 212. The possible routes are determined from only the locations that are within the geographic areas determined at 212 (e.g., which may be filtered based on transportation requirements), and not those locations that are outside the geographic areas. The possible routes are identified by those locations within the geographic areas that make up the possible routes. For example, each possible route can be identified by a sequence of location tuples. In some implementations, the pre-processing operations determine all possible routes from the origin location to the destination location and/or from the pickup location to the delivery location within the geographic areas determined at 212 (e.g., all possible routes that satisfy certain transportation requirements).

After the possible routes are determined, the route pre-processor 210 sends the locations that make up the possible routes to the route optimizer 220, as depicted at 240. In some implementations, only the locations of the possible routes within the third geographic area (the main leg) are sent to the route optimizer 220. The route pre-processor 210 sends only those locations that make up the possible routes to the route optimizer 220, and not other locations regardless of whether they are within or without the geographic areas. In some implementations, the locations are processed into a format that is understandable by the route optimizer 220.

The example environment also includes the route optimizer 220. The route optimizer 220 can be implemented by various software and/or hardware resources (e.g., comprising server resources, database resources, storage resources, software resources, etc.). In some implementations, the route optimizer 220 is implemented by computer instructions running on one or more computer devices (e.g., server resources or cloud computing resources). For example, the route optimizer 220 can be operated as service (e.g., as a cloud service) and as part of a transportation service (e.g., a service that manages transportation and logistics for organizations, such as the SAP® Transportation Management system). The route optimizer 220 can run on the same computing resources as the route pre-processor 210 (e.g., as part of a combined service) or on different computing resources (e.g., as part of a separate or distributed service).

The route optimizer 220 performs various operations to determine optimized routes. As depicted at 222, the locations of the possible routes are received from the route pre-processor 210. As depicted at 224, the route optimizer 220 determines one or more optimized routes using the locations of the possible routes, and not considering locations that are not part of the possible routes. In other words, the route optimizer 220 only searches within the locations that make up the possible routes when determining the optimized routes. When determining the optimized routes, the route optimizer 220 does not have the consider the locations as part of any possible route. Instead, the route optimizer 220 considers the locations regardless of how they were used by the route pre-processor 210 to determine the possible routes. In fact, the route optimizer 220 does not consider the possible routes at all, just the locations that were sent by the route pre-processor 210.

While the route optimizer 220 does not consider locations that are not part of the possible routes, the route optimizer 220 does consider other information when determining the optimized routes. Specifically, the route optimizer 220 considers static definitions of the defined transportation networks, which include transportation schedules, when determining the optimized routes. The route optimizer 220 can also consider other transportation requirements (e.g., the same and/or different transportation requirements as those considered by the route pre-processor 210), such as cost, capacity, and/or time requirements.

The route optimizer 220 can output optimized routes, as depicted at 226. For example, the route optimizer 220 can provide one or more optimized routes to the customer that submitted the customer order 230 (e.g., for display within a transportation planning application).

Figure 3:
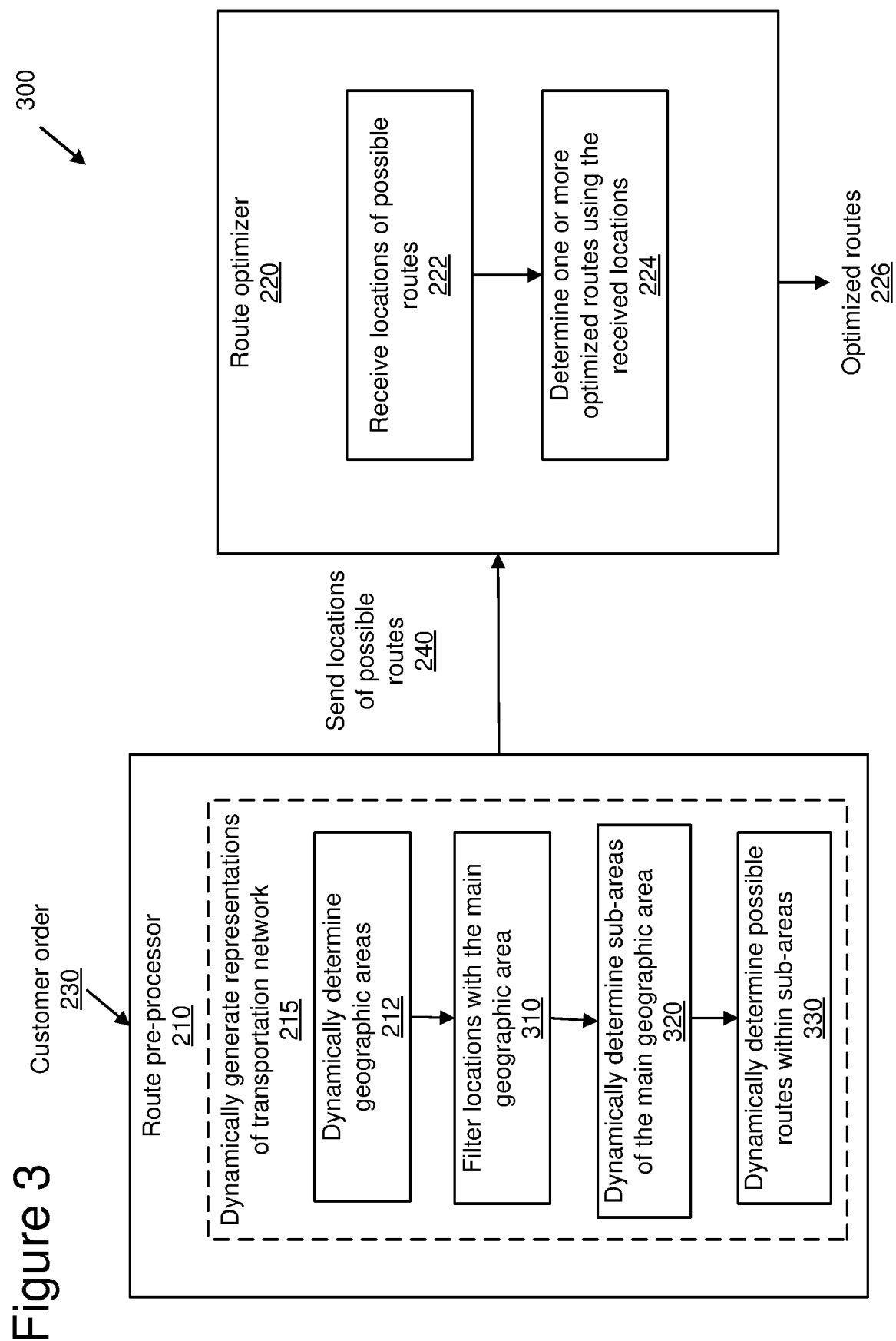
FIG. 3 is a diagram depicting an example environment for determining routes using ULIs, including a route pre-processor that determines possible routes using geographic sub-areas.

FIG. 3 is a diagram depicting an example environment 300 for determining routes, including a route pre-processor that determines possible routes using geographic sub-areas. The example environment 300 is similar to the example environment 200 depicted in FIG. 2, except for the pre-processing operations that are performed. Specifically, as depicted at 310, the locations within the main geographic area (the geographic area representing the main leg) are filtered. The filtered locations are then used when determining the possible routes within the sub-areas. The locations can be filtered based on one or more transportation requirements. For example, the customer order could specify that certain defined transportation networks and/or modes of transportation are to be used. As another example, filtering could be performed based on intrinsic transportation requirements of a given defined transportation network (e.g., a locomotive may need maintenance at certain intervals, so a location that has a locomotive repair facility may be required at certain locations within the possible routes).

As depicted at 320, the pre-processing operations dynamically determine a plurality of sub-areas of the main geographic area determined at 212. The plurality of sub-areas are in a sequence from the origin location to the destination location. In other words, a first sub-area begins with the origin location and ends at an ending location of the first sub area, a second sub-area beings with the ending location of the first sub area and ends at an ending location of the second sub-area, and so on until the destination location is reached.

In some implementations, each sub-area uses one defined transportation network, which is different from the defined transportation networks used by adjacent sub-areas. For example, a first sub-area could use a freight train transportation network, a second sub-area could use a domestic airline transportation network, and a third sub-area could use an international airline transportation network. As another example, a first sub-area could use a freight train transportation network, a second sub-area could use a domestic airline transportation network, and a third sub-area (which is not adjacent to the first sub-area) could use the freight train transportation network. In this way, the mode of transportation is the same within a given sub-area, and transitions between sub-areas. The sub-areas can be determined based at least in part on location types.

The sub-areas can be determined independently or in combination with determining the possible routes at 330. For example, the pre-processing operations can start with the origin location and a given defined transportation network (e.g., one of the available defined transportation networks, which could be filtered by the customer order and/or other transportation requirements) and proceed outward within the geographic area to connecting locations that are part of the given defined transportation network until an ending location is found (e.g., a location that does not provide a further connection via the given defined transportation network or that is otherwise determined to be the ending location based on transportation requirements). The origin location and ending location can form a first sub-area. The pre-processing operations can then proceed, starting with the ending location of the first sub-area and using a different given defined transportation network to create a second sub-area. This procedure can be repeated until a sub-area is generated that reaches the destination location. This procedure can also be used for each possible defined transportation network that is available at the origin location. For example, multiple different sets of sub-areas can be generated, each set representing a different sequence of defined transportation networks. In some implementations, all possible routes using all possible combinations of defined transportation networks are generated from the origin location to the destination location, which can traverse different sets of sub-areas. In some implementations, the sub-areas can be incrementally enlarged so that they include at least one possible route (e.g., using the same procedure as described with respect to incrementally enlarging a geographic area).

As depicted at 330, the pre-processing operations include dynamically determining possible routes from the origin location to the destination location within the geographic sub-areas determined at 320. The possible routes are determined from only the locations that are with the geographic sub-areas determined at 320 (and that have been filtered, as described at 310), and not those locations that are outside the geographic sub-areas. The possible routes are identified by those locations within the geographic sub-areas that make up the possible routes. For example, each possible route can be identified by a sequence of location tuples. In some implementations, the pre-processing operations determine all possible routes from the origin location to the destination location within the geographic sub-areas (e.g., all possible routes that satisfy certain transportation requirements). In some implementations, the pre-processing operations determine all possible routes from the origin location to the destination location within each of multiple sets of geographic sub-areas (e.g., all possible routes that satisfy certain transportation requirements).

After the possible routes are determined, the route pre-processor 210 sends the locations that make up the possible routes to the route optimizer 220, as depicted at 240. In some implementations, only the locations of the possible routes within the geographic sub-areas (which are within the main geographic area) are sent to the route optimizer 220. The route pre-processor 210 sends only those locations that make up the possible routes to the route optimizer 220, and not other locations regardless of whether they are within or without the geographic areas and/or sub-areas. The route optimizer 220 then determines the optimized routes using the received locations, as described herein. In some implementations, the route optimizer 220 can use additional locations when determining the optimized routes. For example, the route optimizer 220 can consider transportation schedules, which could require certain locations to be included in a route (e.g., a specific location could be a required stop location for a certain train schedule).

Figure 4:
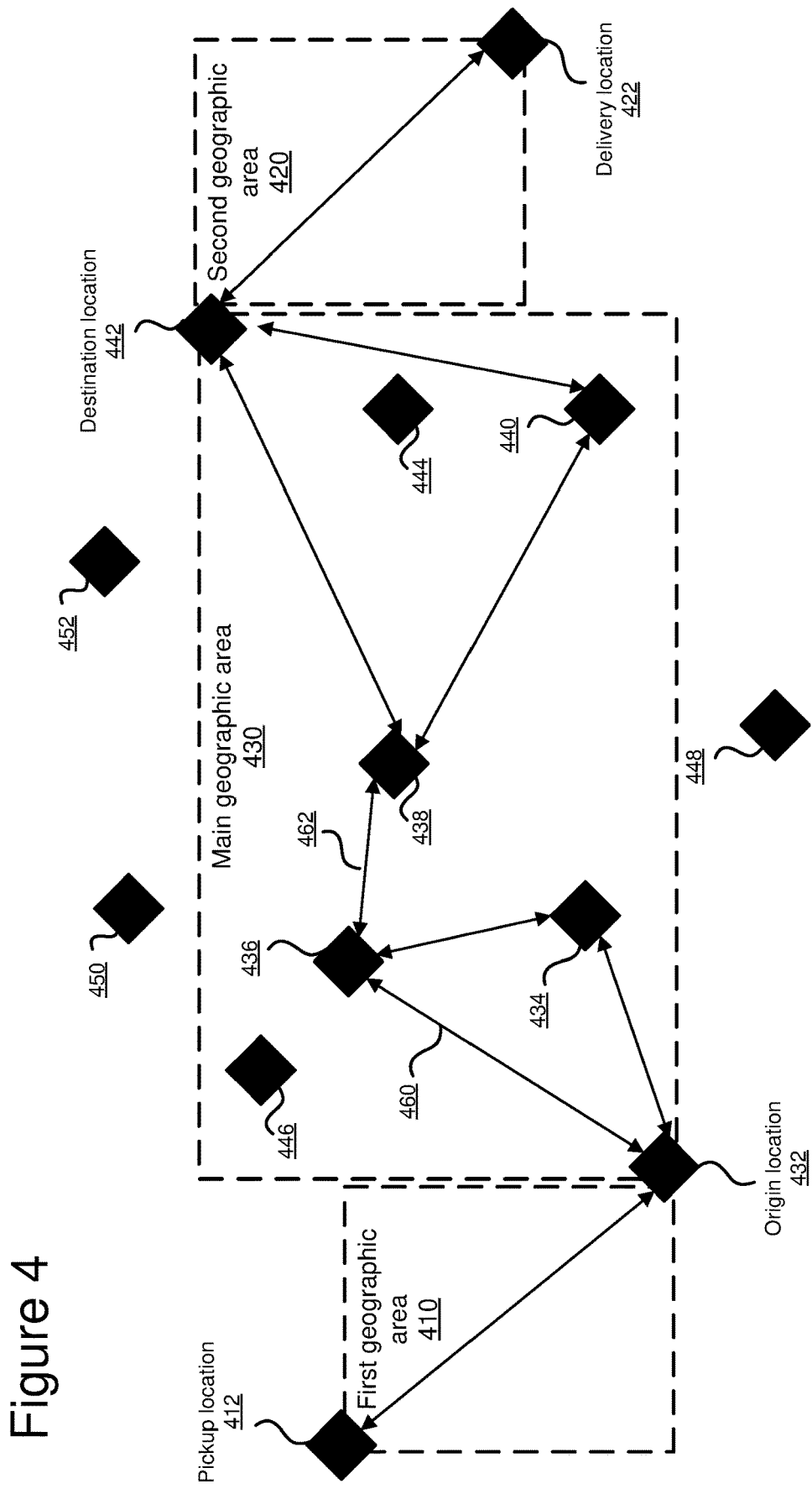
FIG. 4 is a diagram depicting example geographic areas that are determined when performing route planning using ULIs.

FIG. 4 is a diagram depicting example geographic areas that are determined when performing route planning using ULIs. The example geographic areas include a first geographic area 410 for a pickup leg, a second geographic area 420 for a delivery leg, and a main geographic area 430 for a main leg. Pre-processing operations can be performed to determine possible routes through one or more of these geographic areas.

In FIG. 4, the diamond shapes represent locations (e.g., addresses, cities, or other types of locations). One of the locations has been identified as the pickup location 412. For example, the pickup location 412 can be identified by a ULI (e.g., provided by a customer or obtained from a customer order). Using the pickup location 412, the first geographic area 410 is determined as a geographic area (e.g., the smallest rectangular area) that covers the pickup location 412 and a transportation network location that provides transportation services needed to receive the cargo and ship it via one or more defined transportation networks. Specifically, the cargo is picked via a trucking network from the pickup location 412 and delivered to the transportation network location. In this example, the transportation network location is the origin location 432. The origin location 432 is connected to at least one defined transportation network (e.g., a rail network, an air cargo network, etc.). In some implementations, the first geographic area 410 is determined using pre-processing operations.

Similar to the pickup location 412, one of the locations has been identified as the delivery location 422. For example, the delivery location 422 can be identified by a ULI (e.g., provided by a customer or obtained from a customer order). Using the delivery location 422, the second geographic area 420 is determined as a geographic area (e.g., the smallest rectangular area) that covers the delivery location 422 and a transportation network location that provides transportation services needed to receive the cargo via one or more defined transportation networks and ship it to the delivery location 422. Specifically, the cargo is sent via a trucking network from the transportation network location to the delivery location 422. In this example, the transportation network location is the destination location 442. The destination location 422 is connected to at least one defined transportation network (e.g., a rail network, an air cargo network, etc.). In some implementations, the second geographic area 420 is determined using pre-processing operations.

The origin location 432 and the destination location 442 are connected via one or more defined transportation networks. The cargo can be transported from the origin location 432 to the destination location 442 via a single defined transportation network (e.g., via a rail network) or via multiple defined transportation networks (e.g., first via a rail network and then via a domestic airline network). The choice of which defined transportation network to use and/or whether to use one or multiple defined transportation networks can depend on which defined transportation networks are available (e.g., the possible routes) from the origin location 432 to the destination location 442 within the main geographic area 430 and/or on other criteria (e.g., based on transportation requirements).

In some implementations, as part of the pre-processing operations, the main geographic area 430 has been determined as the area that covers the origin location 432 and the destination location 442. In some implementations, the main geographic area 430 is the smallest rectangular area that covers the origin location 432 and the destination location 442.

As illustrated by FIG. 4, the main geographic area 430 divides the locations into those locations that are within the main geographic area 430 (specifically, locations 432, 434, 436, 438, 440, 442, 444, and 446) and those locations that are not within (i.e., are outside) the main geographic area 430 (including locations 448, 450, and 452). The pre-processing operations use those locations that are within the main geographic area 430 when determining the possible routes from the origin location 432 to the destination location 442.

In the example depicted in FIG. 4, the pre-processing operations have identified a number of possible routes. The possible routes are identified by dynamically generating representations of one or more defined transportation networks using those locations that are within the main geographic area 430. For example, the transportation services of each of the locations within the main geographic area 413 can be analyzed. Possible routes can then be built up using locations that have overlapping transportation services. For example, origin location 432 may be part of a freight train transportation network. The other locations within the main geographic area 430 can be examined to determine which of them are also part of the freight train transportation network. For example, location 436 can be part of the freight train transportation network and have a connection 460 (e.g., one or more railway lines) to origin location 432, location 438 can be part of the freight train transportation network and have a connection 462 to location 436, and so on. Using the locations within the main geographic area 430 and the transportation services associated with the locations, the possible routes can be generated, as reflected by the lines with arrows in the main geographic area 430.

In some implementations, the locations within the main geographic area 430 are filtered based on one or more transportation requirements. For example, the locations can be filtered based on one or more transportation requirements that are specified by the customer order and/or from another source (e.g., transportation preferences provided by the customer). For example, the specific possible routes depicted in FIG. 4 could be the result of the customer order specifying that a freight train transportation network should be used for the main leg. Taking this transportation requirement into account, the pre-processing operations would filter the locations so that only those locations within the main geographic are 430 that are part of the freight train transportation network are considered. In this example, locations 444 and 446 are not part of the freight train transportation network and therefore they are excluded from consideration.

In some implementations, the possible routes only use one defined transportation network for the main leg. For example, if the one defined transportation network is a freight train transportation network, then only those locations within the main geographic area 430 that are part of the freight train transportation network (e.g., locations 432, 434, 436, 438, 440, and 442) are considered when determining the possible routes. As another example, if the one defined transportation network is a domestic airline transportation network, then only those locations within the main geographic area 430 that are part of the domestic airline transportation network (e.g., locations 432, 438, 444, 446, and 442) are considered when determining the possible routes. It should be understood that some locations can be part of more than one transportation network (e.g., locations 432, 438, and 442 could be part of the freight train transportation network and the domestic airline transportation network).

In some implementations, the possible routes can use one or more (e.g., multiple) defined transportation networks. For example, a possible route could use a first defined transportation network (e.g., a freight train transportation network) from origin location 432 to location 438 (passing through location 436), and the use a second defined transportation network (e.g., a domestic airline transportation network) from location 438 to location 442 (e.g., passing through location 440).

In some implementations, the locations that are available for use within the main geographic area 430 when determining the possible routes can be filtered based on other transportation requirements. For example, a freight train transportation network can have specific requirements regarding locomotives, crews, etc. Other defined transportation networks can have specific requirements as well.

In some implementations, the initial main geographic area (e.g., main geographic area 430) is analyzed to determine if it contains at least one possible route from the origin location 432 to the destination location 442 using only those locations within the initial main geographic area. If it does, then the pre-processing operations proceed using the initial main geographical area. If not, then the initial main geographic area is incrementally increased in size until it does contain at least one route from the origin location to the destination location. For example, if there was no connection between locations 436 and 438, then the main geographic area 430 could be expanded to encompass location 450 (assuming location 450 supports a possible route from the origin location 432 to the destination location 442).

Figure 5:
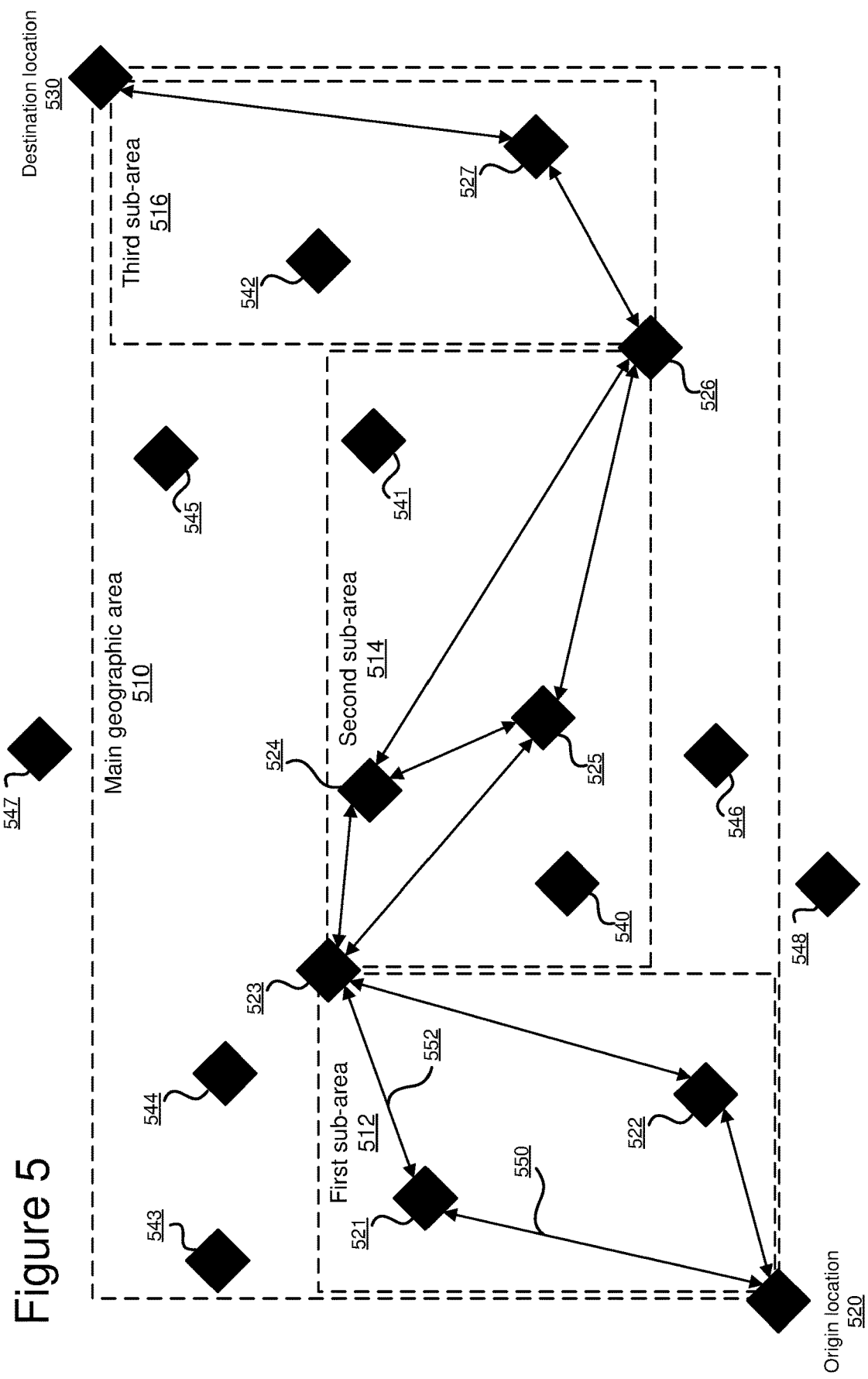
FIG. 5 is a diagram depicting an example main geographic area, and sub-areas, in which pre-processing operations are performed using ULIs to determine possible routes.

FIG. 5 is a diagram depicting an example main geographic area 510, and sub-areas, in which pre-processing operations are performed using ULIs to determine possible routes. In FIG. 5, the diamond shapes represent locations (e.g., addresses, cities, or other types of locations). One of the locations has been identified as the origin location 520 and another location has been identified as the destination location 530. The main geographic area 510 is similar to the main geographic area 430, but in FIG. 5 a number of sub-areas have been determined within the main geographic area 510. Because FIG. 5 focuses on the main geographic area 510, the pickup and destination locations (and corresponding geographic areas for the pickup leg and destination leg) are not shown. In general, there is a pickup location and corresponding first geographic area connecting the pickup location to origin location 520 (e.g., similar to the pickup location 412 and first geographic area 410) and a delivery location and corresponding second geographic area connecting the delivery location to the destination location (e.g., similar to the delivery location 422 and second geographic area 420).

As part of the pre-processing operations, the main geographic area 510 has been determined as the area that covers the origin location 520 and the destination location 530. In some implementations, the main geographic area 510 is the smallest rectangular area that covers the origin location 520 and the destination location 530.

As illustrated by FIG. 5, the main geographic area 510 divides the locations into those locations that are within the main geographic area 510 (specifically, locations 520, 521, 522, 523, 524, 525, 526, 527, 530, 540, 541, 542, 543, 544, 545, and 546) and those locations that are not within (i.e., are outside) the main geographic area 510 (specifically, locations 547 and 548). The pre-processing operations use those locations that are within the main geographic area 510 when determining the geographic sub-areas and subsequently the possible routes from the origin location 520 to the destination location 530.

In the example depicted in FIG. 5, the pre-processing operations have identified a plurality of geographic sub-areas. Specifically, three sub-areas have been identified: a first sub-area 512, a second sub-area 514, and a third sub-area 516. The possible routes within a given sub-area all use the same defined transportation network and/or mode of transportation. For example, locations 520, 521, 522, and 523 within the first sub-area 512 could all be part of a freight train transportation network, locations 523, 524, 525, and 526 within the second sub-area 514 could all be part of a domestic airline transportation network, and locations 526, 527, and 530 within the third sub-area 516 could all be part of a freight train transportation network. As illustrated by these three sub-areas, a given location could be part of two or more defined transportation networks. For example, location 523 could be part of the freight train transportation network and the domestic airline transportation network (e.g., it could have both a freight train terminal and an airport, and thus serve as a location that supports transitioning between the different defined transportation networks).

In the example depicted in FIG. 5, the pre-processing operations have identified a number of possible routes. The possible routes are identified by dynamically generating representations of one or more defined transportation networks using those locations that are within the main geographic area 510 and/or the sub-areas 512, 514, and 516. For example, the transportation services of each of the locations within the geographic area and/or sub-areas can be analyzed. Possible routes can then be built up using locations that have overlapping transportation services. For example, origin location 520 may be part of a freight train transportation network. The other locations within the geographic area 510 can be examined to determine which of them are also part of the freight train transportation network. For example, location 521 can be part of the freight train transportation network and have a connection 550 (e.g., one or more railway lines) to origin location 520, location 523 can be part of the freight train transportation network and have a connection 552 to location 521, and so on. Using the locations within the main geographic area 510 and the transportation services associated with the locations, the possible routes can be generated, as reflected by the lines with arrows in FIG. 5. The sub-areas can be determined using a similar procedure. For example, if origin location 520 is part of the freight train transportation network, then the connected locations can be followed to determine the sub-area that supports possible routes using the freight train transportation network (in this example, the first sub-area 512). In this example, location 523 is identified as the ending location for the first sub-area 512 (e.g., location 523 is not connected to other locations via the freight train transportation network or there are other transportation requirements that indicate location 523 is the ending location, such as the customer order specifying a switch to an airline network).

In some implementations, the locations within the main geographic area 510 and/or sub-areas 512, 514, and 516 are filtered based on one or more transportation requirements. For example, the locations can be filtered based on one or more transportation requirements that are specified by the customer order and/or from another source (e.g., transportation preferences provided by the customer). For example, the specific possible routes depicted in FIG. 5 could be the result of the customer order specifying that a freight train transportation network and a domestic airline transportation networks should be used. Taking these transportation requirements into account, the pre-processing operations would filter the locations so that only those locations within the main geographic are 510 that are part of the freight train transportation network or the domestic airline transportation network are considered. In this example, locations 540, 541, 542, 543, 544, 545, and 546 are not part of the freight train or domestic airline transportation networks and therefore they are excluded from consideration.

In some implementations, the possible routes within a given sub-area only use one defined transportation network. For example, sub-area 512 uses only a freight train transportation network, sub-area 514 uses only a domestic airline transportation network, and sub-area 516 uses only an international airline transportation network. Furthermore, the locations within a given sub-area can be filtered so that only those locations that are part of the defined transportation network being used for the given sub-area are considered. For example, if the second sub-area 514 is using a domestic airline transportation network, and location 541 is not part of the domestic airline transportation network, it can be excluded from consideration for possible routes. It should be understood that some locations can be part of more than one defined transportation network.

In some implementations, the locations that are available for use within the main geographic area 510 and/or sub-areas 512, 514, and 516 when determining the possible routes can be filtered based on other transportation requirements. For example, a freight train transportation network can have specific requirements regarding locomotives, crews, etc. Other transportation networks can have specific requirements as well.

In some implementations, the initial main geographic area (e.g., main geographic area 510) is analyzed to determine if it contains at least one possible route from the origin location 520 to the destination location 530 using only those locations within the initial main geographic area. If it does, then the pre-processing operations proceed using the initial main geographical area. If not, then the initial main geographic area is incrementally increased in size until it does contain at least one route from the origin location to the destination location. A similar procedure can be used when determining the sub-areas.

Route planning within the main geographic area (e.g., within main geographic area 430 or 510) is determined using defined transportation networks. Defined transportation networks have schedules. Defined transportation networks include train networks, airline networks, ocean shipping networks, and other defined transportation networks with schedules. Defined transportation networks have established connections (e.g., route stages) between established locations (e.g., airline routes between various airport locations). Defined transportation networks do not include modes of transport that do not have schedules and/or that do not travel between established locations. For example, a trucking network that provides pickup and/or delivery services to arbitrary locations (e.g., customer business addresses) is not a defined transportation network.

Methods for Determining Route Proposals Using ULIs

In the technologies described herein, methods can be provided for determining route proposals using ULIs. For example, hardware and/or software elements can perform operations to determine route proposals (e.g., comprising possible routes and/or optimized routes). For example, the determination can be performed by a route pre-processor (e.g., route pre-processor 210) and/or a route optimizer (e.g., route optimizer 220).

Figure 6:
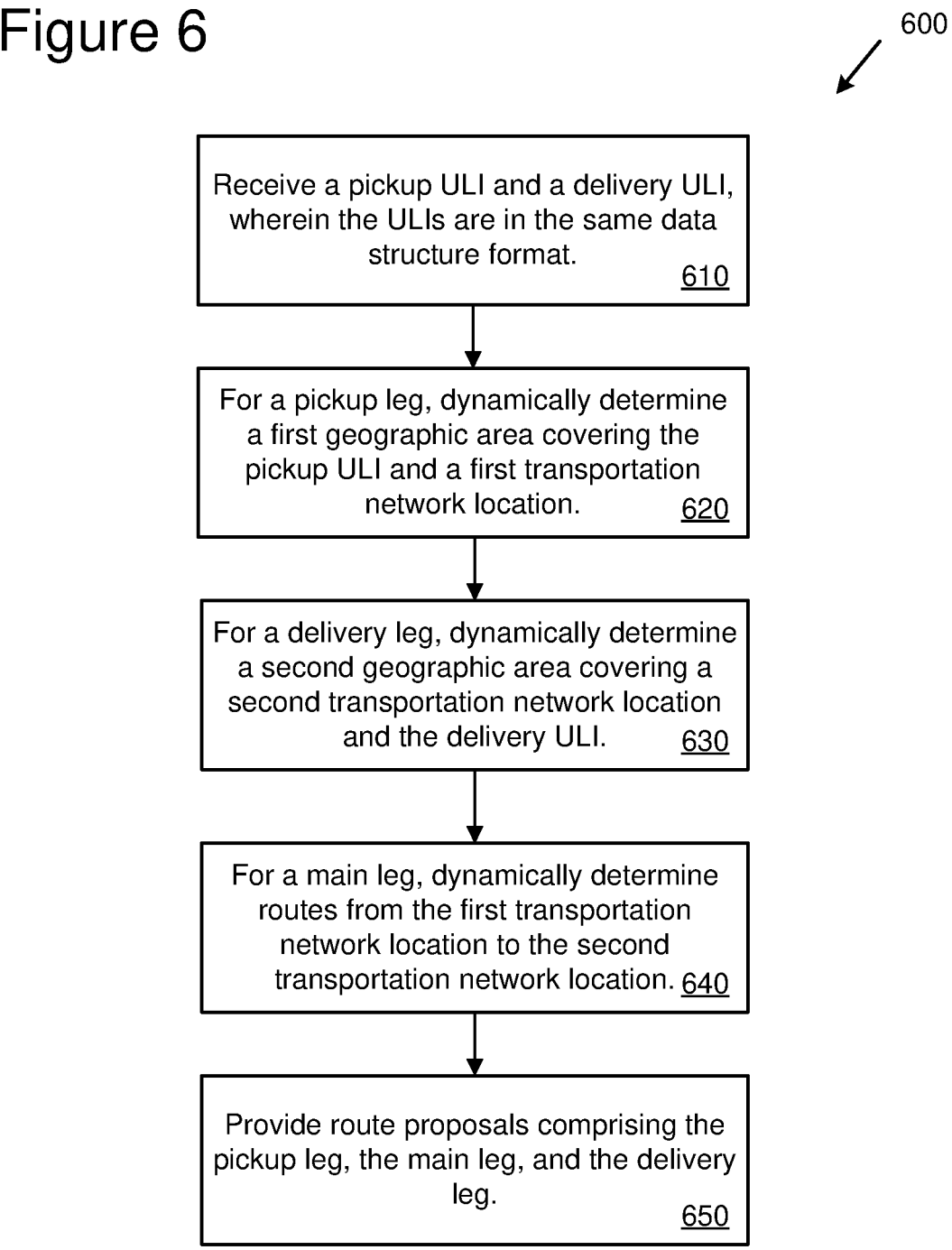
FIG. 6 is a is a flowchart of an example method for determining route proposals for shipment of cargo using ULIs.

FIG. 6 is a flowchart depicting an example process 600 for determining route proposals for shipment of cargo using ULIs. In some implementations, a route pre-processor and/ or a route optimizer is programmed with computer instructions to implement an algorithm as described by FIG. 6.

At 610, a pickup ULI and a delivery ULI are received. The pickup ULI and the delivery ULI are in the same data structure format, which is the format described herein for ULIs. In some implementations, a customer order is received that comprises the pickup ULI (e.g., an address of a business where the cargo is picked up) and the delivery ULI (e.g., an address of another business where the cargo is delivered). The customer order can also comprise other transportation requirements, such as an origin location, a destination location, indications of one or more defined transportation networks to use for the main leg, a drop-off time, an arrival time, a transit time, and/or other transportation requirements.

At 620, for a pickup leg, a first geographic area is dynamically determined. The first geographic area covers the pickup ULI and a first transportation network location (also called the origin location) of a defined transportation network. The cargo is picked up from the pickup ULI and shipped to the first transportation network location via a first trucking network. The first transportation network location has transportation services capable of handling the cargo. For example, if the cargo is a container that is to be shipped via a rail network, then the first transportation network location needs to have container handling services to load the container onto a rail network.

At 630, for a delivery leg, a second geographic area is dynamically determined. The second geographic area is different from the first geographic area. The second geographic area covers a second transportation network location (also called the destination location) of a defined transportation network and the delivery ULI. The cargo is picked up from the second transportation network location and shipped to the delivery ULI via a second trucking network. The second transportation network location has transportation services capable of handling the cargo. For example, if the cargo is a container, then the second transportation network location needs to have container handling services to receive the container (e.g., unload the container from a rail car) for delivery to the delivery ULI. The second transportation network location is a different location from the first transportation network location. The second trucking network may or may not be different from the first trucking network. For example, the same trucking company can perform the pickup leg and the delivery leg, or a different trucking company could perform the pickup and delivery legs.

At 640, for a main leg, one or more routes are dynamically determined from the first transportation network location to the second transportation network location via one or more defined transportation networks. In some implementations, pre-processing operations are performed to determine possible routes for at least the main leg from the first transportation network location to the second transportation network location. The pre-processing operations determine the possible routes by dynamically generating representations of the one or more defined transportation networks at runtime (e.g., without utilizing transportation schedules and without considering capacity, cost, or time transportation requirements). In some implementations, the pre-processing operations dynamically determine a third geographic area (also referred to as the main geographic area for the main leg) that covers the first transportation network location and the second transportation network location. In some implementations, a plurality of sub-areas are determined within the main geographic area.

The first transportation network location and the second transportation network location can be connected to the same defined transportation network or to different defined transportation networks. For example, if there is only one defined transportation network used for the main leg, then then the first and second transportation network locations would be part of the same defined transportation network (e.g., both part of the same rail network). However, if there are multiple defined transportation networks used for the main leg, then the first and second transportation network locations could be part of different defined transportation networks (e.g., the first location could be part of a rail network and the second location could be part of an air cargo network).

At 650, one or more route proposals are provided. The one or more route proposals comprise the pickup leg, the main leg, and the delivery leg. The one or more route proposals indicate proposed routes for shipping the cargo from the pickup location to the delivery location through the three legs. The one or more route proposals can also indicate information about the routes such as timing or scheduling information, estimated cost, modes of transportation, transportation networks being used for the legs and/or stages, etc. The one or more route proposals can be output (e.g., provided to a customer, displayed in a computer user interface, saved to a file or database, etc.).

In some implementations, the pre-processing operations described at 640 identify the possible routes by the locations that make up the possible routes (e.g., as a set of location tuples or in another format). In some implementations, the possible routes are identified by a sequence of location tuples, each location tuple representing a stage of two adjacent locations associated with a given defined transportation network. The possible routes can be provided for route optimization. Optimized routes can then be used as part of the route proposals (e.g., for the main leg).

In some implementations, only those locations that make up the possible routes are provided for route optimization. For example, the locations that make up the possible routes (e.g., in the format of sets of location tuples) can be provided to a route optimizer. During route optimization, one or more optimized routes are determined using the provided locations. Route optimization is performed using additional transportation requirements (additional to those used when determining the possible routes) as well as transportation schedules. In some implementations, static definitions of the defined transportation networks (e.g., comprising the transportation schedules and other information defining the transportation networks) are used when determining the optimized routes.

Figure 7:
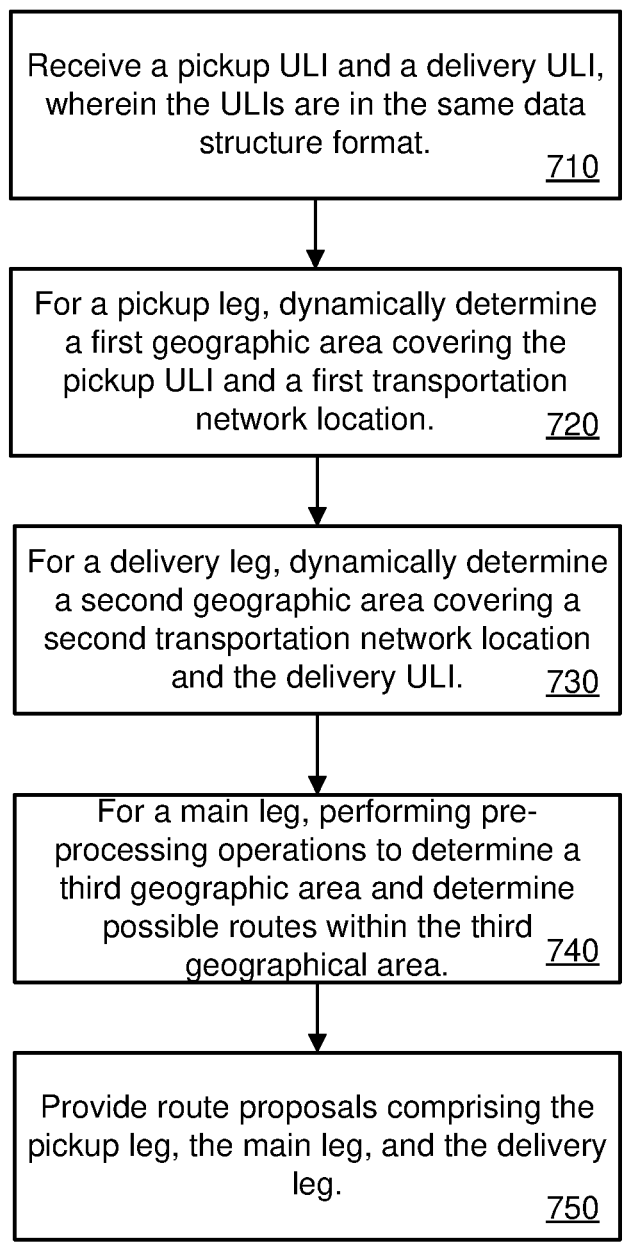
FIG. 7 is a is a flowchart of an example method for determining route proposals for shipment of cargo using ULIs.

FIG. 7 is a flowchart depicting an example process 700 for determining route proposals for shipment of cargo using ULIs. In some implementations, a route pre-processor and/or a route optimizer is programmed with computer instructions to implement an algorithm as described by FIG. 7.

At 710, a pickup ULI and a delivery ULI are received. The pickup ULI and the delivery ULI are in the same data structure format, which is the format described herein for ULIs. In some implementations, a customer order is received that comprises the pickup ULI (e.g., an address of a business where the cargo is picked up) and the delivery ULI (e.g., an address of another business where the cargo is delivered). The customer order can also comprise other transportation requirements, such as an origin location, a destination location, indications of one or more defined transportation networks to use for the main leg, a drop-off time, an arrival time, a transit time, and/or other transportation requirements.

At 720, for a pickup leg, a first geographic area is dynamically determined. The first geographic area covers the pickup ULI and a first transportation network location (also called the origin location) of a defined transportation network. The cargo is picked up from the pickup ULI and shipped to the first transportation network location via a first trucking network. The first transportation network location has transportation services capable of handling the cargo. For example, if the cargo is a container that is to be shipped via a rail network, then the first transportation network location needs to have container handling services to load the container onto a rail network.

At 730, for a delivery leg, a second geographic area is dynamically determined. The second geographic area is different from the first geographic area. The second geographic area covers a second transportation network location (also called the destination location) of a defined transportation network and the delivery ULI. The cargo is picked up from the second transportation network location and shipped to the delivery ULI via a second trucking network. The second transportation network location has transportation services capable of handling the cargo. For example, if the cargo is a container, then the second transportation network location needs to have container handling services to receive the container (e.g., unload the container from a rail car) for delivery to the delivery ULI. The second transportation network location is a different location from the first transportation network location. The second trucking network may or may not be different from the first trucking network. For example, the same trucking company can perform the pickup leg and the delivery leg, or a different trucking company could perform the pickup and delivery legs.

At 740, for a main leg, pre-processing operations are performed to determine a third geographic area (also referred to as the main geographic area) and to determine possible routes within the third geographic area. Specifically, the third geographic area is dynamically determined and covers the first transportation network location and the second transportation network location. One or more possible routes are then dynamically determined from the first transportation network location to the second transportation network location within the third geographic area. Route optimization can then be performed for the one or more possible routes. The pre-processing operations determine the one or more possible routes by dynamically generating representations of one or more defined transportation networks at runtime (e.g., without utilizing transportation schedules and without considering capacity, cost, or time transportation requirements). In some implementations, a plurality of sub-areas are determined within the main geographic area.

At 750, one or more route proposals are provided. The one or more route proposals comprise the pickup leg, the main leg, and the delivery leg. The one or more route proposals indicate proposed routes for shipping the cargo from the pickup location to the delivery location through the three legs. The one or more route proposals can also indicate information about the routes such as timing or scheduling information, estimated cost, modes of transportation, transportation networks being used for the legs and/or stages, etc. The one or more route proposals can be output (e.g., provided to a customer, displayed in a computer user interface, saved to a file or database, etc.).

In some implementations, the pre-processing operations described at 740 identify the possible routes by the locations that make up the possible routes (e.g., as a set of location tuples or in another format). In some implementations, the possible routes are identified by a sequence of location tuples, each location tuple representing a stage of two adjacent locations associated with a given defined transportation network. The possible routes can be provided for route optimization. Optimized routes can then be used as part of the route proposals (e.g., for the main leg).

In some implementations, only those locations that make up the possible routes are provided for route optimization. For example, the locations that make up the possible routes (e.g., in the format of sets of location tuples) can be provided to a route optimizer. During route optimization, one or more optimized routes are determined using the provided locations. Route optimization is performed using additional transportation requirements (additional to those used when determining the possible routes) as well as transportation schedules. In some implementations, static definitions of the defined transportation networks (e.g., comprising the transportation schedules and other information defining the transportation networks) are used when determining the optimized routes.

The pre-processing operations determine the possible routes between two transportation network locations (e.g., from an origin location to a destination location) by dynamically generating representations of the defined transportation networks at runtime. For example, the pre-processing operations may only consider some locations in dynamically generating a representation of a given defined transportation network (e.g., based on geographic area and/or sub-areas, transportation requirements, services, without regard to transportation schedules, without regard to capacity, and/or other criteria). In some implementations, this means that the pre-processing operations only consider individual location definitions that indicate the transportation services available at a given location as well as which other location(s) are connected to the given location (e.g., indicated by location tuples). In some implementations, this also means that the pre-processing operations do not consider capacity or time transportation requirements (e.g., the pre-processing operations do not take into account the specific transportation vehicles used by the defined transportation networks, their capacities, and their schedules).

Computing Systems

Figure 8:
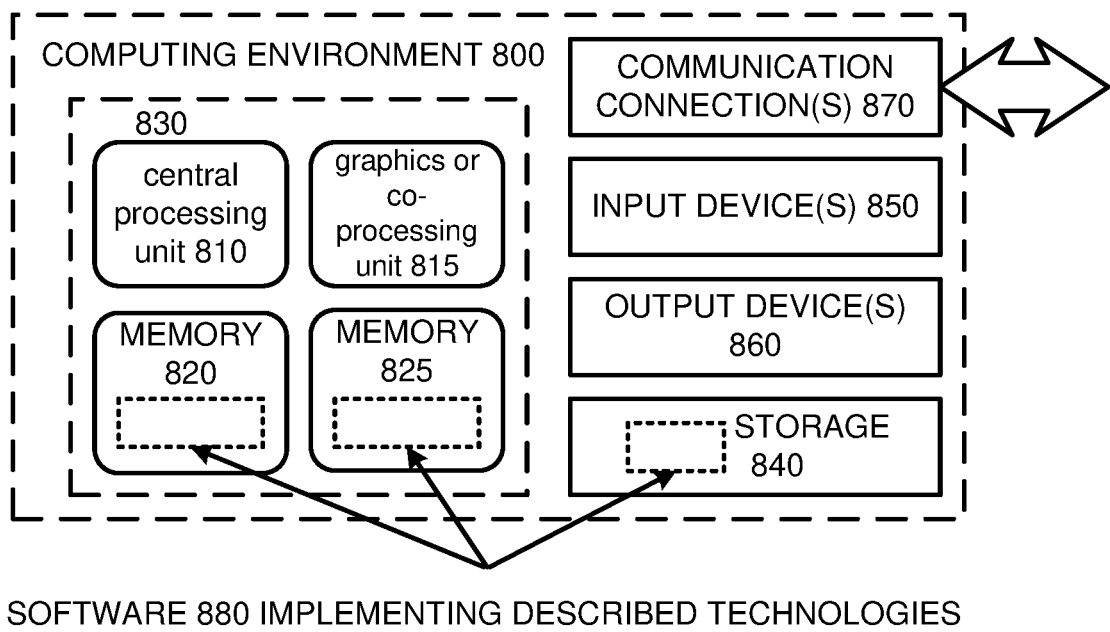
FIG. 8 is a diagram of an example computing system in which some described embodiments can be implemented.

FIG. 8 depicts a generalized example of a suitable computing system 800 in which the described innovations may be implemented. The computing system 800 is not intended to suggest any limitation as to scope of use or functionality, as the innovations may be implemented in diverse general-purpose or special-purpose computing systems.

With reference to FIG. 8, the computing system 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s).

A computing system may have additional features. For example, the computing system 800 includes storage 840, one or more input devices 850, one or more output devices 860, and one or more communication connections 870. An interconnection mechanism (not shown) such as a bus, controller, or network interconnects the components of the computing system 800. Typically, operating system software (not shown) provides an operating environment for other software executing in the computing system 800, and coordinates activities of the components of the computing system 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing system 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing system 800. For video encoding, the input device(s) 850 may be a camera, video card, TV tuner card, or similar device that accepts video input in analog or digital form, or a CD-ROM or CD-RW that reads video samples into the computing system 800. The output device(s) 860 may be a display, printer, speaker, CD-writer, or another device that provides output from the computing system 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Cloud Computing Environment

Figure 9:
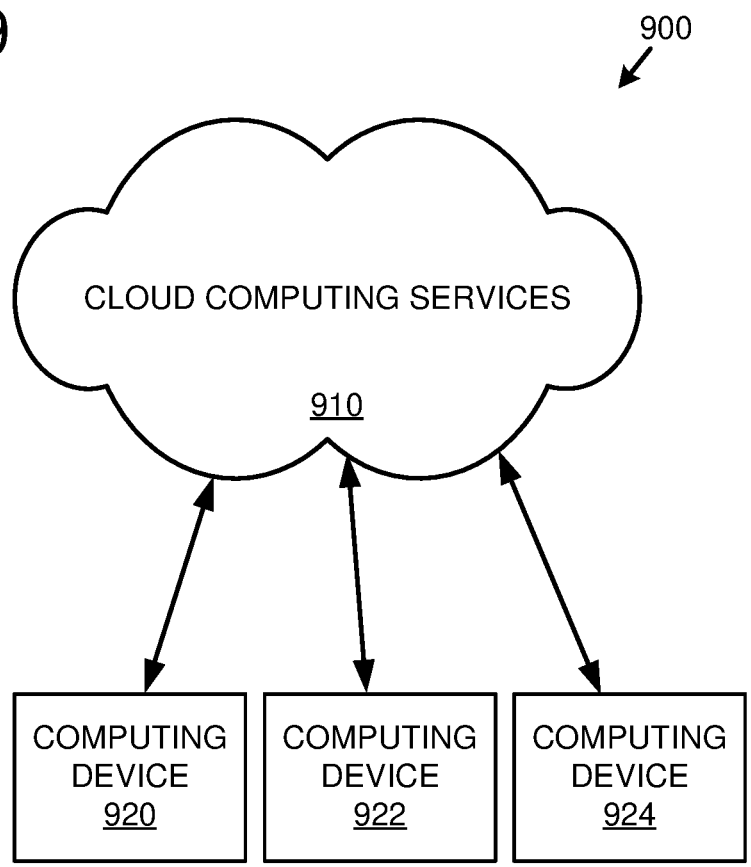
FIG. 9 is an example cloud computing environment that can be used in conjunction with the technologies described herein.

FIG. 9 depicts an example cloud computing environment 900 in which the described technologies can be implemented. The cloud computing environment 900 comprises cloud computing services 910. The cloud computing services 910 can comprise various types of cloud computing resources, such as computer servers, data storage repositories, database resources, networking resources, etc. The cloud computing services 910 can be centrally located (e.g., provided by a data center of a business or organization) or distributed (e.g., provided by various computing resources located at different locations, such as different data centers and/or located in different cities or countries).

The cloud computing services 910 are utilized by various types of computing devices (e.g., client computing devices), such as computing devices 920, 922, and 924. For example, the computing devices (e.g., 920, 922, and 924) can be computers (e.g., desktop or laptop computers), mobile devices (e.g., tablet computers or smart phones), or other types of computing devices. For example, the computing devices (e.g., 920, 922, and 924) can utilize the cloud computing services 910 to perform computing operators (e.g., data processing, data storage, and the like).

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (i.e., any available computing device, including smart phones or other mobile devices that include computing hardware). Computer-readable storage media are tangible media that can be accessed within a computing environment (one or more optical media discs such as DVD or CD, volatile memory (such as DRAM or SRAM), or nonvolatile memory (such as flash memory or hard drives)). By way of example and with reference to FIG. 8, computer-readable storage media include memory 820 and 825, and storage 840. The term computer-readable storage media does not include signals and carrier waves. In addition, the term computer-readable storage media does not include communication connections, such as 870.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A method, performed by one or more computing devices, for determining route proposals for shipment of cargo, the method comprising:
receiving, by the one or more computing devices, a pickup unique location identifier (ULI) and a delivery ULI, wherein the pickup ULI and the delivery ULI are in a same data structure format;
for a pickup leg, dynamically determining, by the one or more computing devices at runtime, a first geographic area that covers the pickup ULI and a first transportation network location, wherein the cargo is picked up and shipped to the first transportation network location via a trucking network, and wherein the first transportation network location has transportation services for handling the cargo;
for a delivery leg, dynamically determining, by the one or more computing devices at runtime, a second geographic area that covers a second transportation network location and the delivery ULI, wherein the cargo is shipped from the second transportation network location and delivered to the delivery ULI via a second trucking network, and wherein the second transportation network location has transportation services for handling the cargo;

for a main leg, performing pre-processing operations by the one or more computing devices, the pre-processing operations comprising:

dynamically determining, at runtime, a third geographic area that covers the first transportation network location and the second transportation network location; and dynamically determining, at runtime, one or more possible routes from the first transportation network location to the second transportation network location within the third geographic area by dynamically generating representations of one or more defined transportation networks; and providing, by the one or more computing devices, one or more route proposals comprising the pickup leg, the main leg, and the delivery leg.

2. The method of claim 1, wherein the ULI data structure format comprises the following data fields:
a transportation mode field;
a priority field;
one or more geo-coordinate fields; and
a transportation services field.

3. The method of claim 1, wherein the ULI data structure format comprises the following data fields:
a country field;
a check number field;
a transportation mode field;
a priority field;
one or more geo-coordinate fields;
a transportation services field; and
a location type field.

4. The method of claim 1, further comprising:
receiving a customer order, wherein the customer order comprises transportation requirements, the transportation requirements comprising the pickup ULI and the delivery ULI.

5. The method of claim 1, further comprising:
providing only those locations that make up the one or more possible routes for route optimization, wherein the route optimization generates one or more optimized routes that are used for the main leg.

6. The method of claim 5, wherein the one or more optimized routes are determined by utilizing, at least in part, static definitions for the one or more defined transportation networks, including one or more transportation schedules.

7. The method of claim 1, the pre-processing operations further comprising:
filtering locations of the one or more defined transportation networks within the third geographic area to remove those that do not meet at least one or more of transportation requirements;
wherein the dynamically generated representations use the filtered locations.

8. The method of claim 1, the pre-processing operations further comprising:
dynamically determining, at runtime, a plurality of sub-areas of the third geographic area, wherein the plurality of sub-areas are in a sequence from the first transportation network location to the second transportation network location, and wherein locations within each sub-area have one or more transportation services in common;
wherein the one or more possible routes traverse locations with the plurality of sub-areas; and
wherein each sub-area uses a single defined transportation network that is different from adjacent sub-areas.

9. One or more computing devices comprising:
one or more processors; and
memory;
the one or more computing devices configured, via computer-executable instructions, to perform operations for determining route proposals for shipment of cargo, the operations comprising:
receiving a pickup unique location identifier (ULI) and a delivery ULI, wherein the pickup ULI and the delivery ULI are in a same data structure format;
for a pickup leg of a shipment:
dynamically determining, at runtime, a first geographic area that covers the pickup ULI and a first transportation network location, wherein the cargo is picked up and shipped to the first transportation network location via a trucking network, and wherein the first transportation network location has transportation services for handling the cargo;
for a delivery leg of the shipment:
dynamically determining, at runtime, a second geographic area that covers a second transportation network location and the delivery ULI, wherein the cargo is shipped from the second transportation network location and delivered to the delivery ULI via a second trucking network, and wherein the second transportation network location has transportation services for handling the cargo;
for a main leg of the shipment, performing pre-processing operations comprising:
dynamically determining, at runtime, a third geographic area that covers the first transportation network location and the second transportation network location;
dynamically determining, at runtime, one or more possible routes from the first transportation network location to the second transportation network location within the third geographic area, wherein the pre-processing operations determine the one or more possible routes by dynamically generating representations of one or more defined transportation networks at runtime; and
providing only the locations for the one or more possible routes for route optimization; and
providing one or more route proposals comprising the pickup leg, the main leg, and the delivery leg.

10. The one or more computing devices of claim 9, wherein the ULI data structure format comprises the following data fields:
a transportation mode field;
a priority field;
one or more geo-coordinate fields; and
a transportation services field.

11. The one or more computing devices of claim 9, wherein the ULI data structure format comprises the following data fields:
a country field;
a check number field;
a transportation mode field;
a priority field;
one or more geo-coordinate fields;
a transportation services field; and
a location type field.

12. The one or more computing devices of claim 9, operations further comprising:
  receiving a customer order, wherein the customer order comprises transportation requirements, the transportation requirements comprising the pickup ULI and the delivery ULI.

13. The one or more computing devices of claim 9,
  wherein the route optimization generates one or more optimized routes that are used for the main leg; and
  wherein the one or more optimized routes are determined by utilizing, at least in part, static definitions for the one or more defined transportation networks, including one or more transportation schedules.

14. The one or more computing devices of claim 9, the pre-processing operations further comprising:
  dynamically determining, at runtime, a plurality of sub-areas of the third geographic area, wherein the plurality of sub-areas are in a sequence from the first transportation network location to the second transportation network location, and wherein locations within each sub-area have one or more transportation services in common;
  wherein the one or more possible routes traverse locations with the plurality of sub-areas; and
  wherein each sub-area uses a single defined transportation network that is different from adjacent sub-areas.

15. One or more computer-readable storage media storing computer-executable instructions for execution on one or more computing devices to perform operations, the operations comprising:
  receiving a pickup unique location identifier (ULI) and a delivery ULI, wherein the pickup ULI and the delivery ULI are in a same data structure format;
  for a pickup leg of a shipment:
    dynamically determining, at runtime, a first geographic area that covers the pickup ULI and a first transportation network location, wherein the cargo is picked up and shipped to the first transportation network location via a trucking network, and wherein the first transportation network location has transportation services for handling the cargo;
  for a delivery leg of the shipment:
    dynamically determining, at runtime, a second geographic area that covers a second transportation network location and the delivery ULI, wherein the cargo is shipped from the second transportation network location and delivered to the delivery ULI via a second trucking network, and wherein the second transportation network location has transportation services for handling the cargo;
  for a main leg of the shipment, performing pre-processing operations comprising:
    dynamically determining, at runtime, a third geographic area that covers the first transportation network location and the second transportation network location;
    dynamically determining, at runtime, one or more possible routes from the first transportation network location to the second transportation network location within the third geographic area, wherein the pre-processing operations determine the one or more possible routes by dynamically generating representations of one or more defined transportation networks at runtime; and
    providing only the locations for the one or more possible routes for route optimization; and
  providing one or more route proposals comprising the pickup leg, the main leg, and the delivery leg.

16. The one or more computer-readable storage media of claim 15, wherein the ULI data structure format comprises the following data fields:
  a transportation mode field;
  a priority field;
  one or more geo-coordinate fields; and
  a transportation services field.

17. The one or more computer-readable storage media of claim 15, wherein the ULI data structure format comprises the following data fields:
  a country field;
  a check number field;
  a transportation mode field;
  a priority field;
  one or more geo-coordinate fields;
  a transportation services field; and
  a location type field.

18. The one or more computer-readable storage media of claim 15, the operations further comprising:
  receiving a customer order, wherein the customer order comprises transportation requirements, the transportation requirements comprising the pickup ULI and the delivery ULI.

19. The one or more computer-readable storage media of claim 15,
  wherein the route optimization generates one or more optimized routes that are used for the main leg; and
  wherein the one or more optimized routes are determined by utilizing, at least in part, static definitions for the one or more defined transportation networks, including one or more transportation schedules.

* * * * *